Patented Sept. 12, 1939

2,172,753

UNITED STATES PATENT OFFICE 2,172,753

DISAZO DYES FOR CELLULOSE ESTERS

Donovan E. Kvalnes, Penns Grove, N. J., assignor to E. I. du Pont de Nemours & Company, Wilmington, Del., a corporation of Delaware No Drawing. Original application July 14, 1937, Serial No. 153,518. Divided and this application July 30, 1938, Serial No. 222,198

10 Claims. (Cl. 8—48)

This invention relates to new disazo dyes which are useful for producing shades of blue and black of superior fastness on textile materials composed of or containing cellulose esters and ethers, to cellulose ester and ether fibres dyed with the dyes and to processes for producing said dyes and dyeings.

Heretofore black dyeings on cellulose acetate have been obtained by diazotization on the fiber of a direct dyeing of certain amino azo compounds and developing with beta hydroxynaphthoic acid under slightly acid conditions. Examples of such amino azo compounds are 4'-amino-4-(dimethyl amino) azo benzene, 4'-amino benzene azo-4-amino naphthalene and 4'-amino, 2'-chloro, 4(dimethyl amino) azo benzene. There have also been used compounds represented by the formula

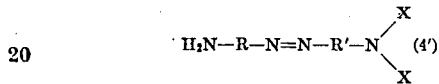

wherein R represents a phenyl radical substituted or not by halogen, alkyl or alkoxyl, R' a phenyl or naphthyl radical substituted or not by halogen or alkyl, and X stands for methyl, ethyl or hydroxy ethyl. These compounds were diazotized on the fiber and developed with 2-hydroxy naphthalene-3-carboxylic acid. In the latter compounds the two groups on the tertiary amino nitrogen are alike, such as two methyl groups or two hydroxy ethyl groups. These dyes were satisfactory in many respects but they were not entirely satisfactory in respect to some important factors in practical dyeing. When subjected to steam, heat or severe washing the dyeings made with dyes having a dimethyl or diethyl tertiary amino group stained undyed cellulose acetate to an undesirable extent and they were thus unsatisfactory from the standpoint of bleeding. When the X's of the tertiary amino group were hydroxy ethyl the dyeing of the fabrics with the amino base was an unsatisfactory operation because the dye baths containing such compounds had unsatisfactory exhaust values although the developed dyes were better with respect to bleeding than those in which the tertiary amino group was dimethyl or diethyl. Therefore, it was desirable to provide dyes which do not have these defects.

An object of this invention is to provide dyeings of black shades on materials of cellulose esters and ethers, such as cellulose acetate which have superior fastness and non-bleeding properties such that they will not impart stain on adjacent undyed materials of the kind when subjected to steam, heat or severe washing. Another object of the invention is to provide developed dyes on fabrics of cellulose esters and ethers, and especially on textile materials of cellulose acetate. Other objects of the invention will be apparent from the following description.

The objects of the invention are attained in general by dyeing a material of cellulose ester or ether, such as a cellulose acetate textile material with an amino azo compound which is represented by the formula

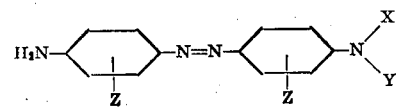

in which X is alkyl, Y is hydroxyl alkyl and Z is one of the group consisting of hydrogen, halogen, alkyl and alkoxy. The compound is diazotized on the fiber and coupled with beta-oxynaphthoic acid by warming in a medium in which the pH is less than 7.1.

The invention is illustrated but not limited by the following examples.

Example I

4'-amino-4-(ethyl, hydroxy ethyl amino) azo benzene was prepared in the following manner. The compound 4'-nitro-4-(ethyl, hydroxy ethyl amino) azo benzene was prepared by coupling diazotized para nitro aniline to ethyl, hydroxy ethyl aniline by methods well known in the art. The nitro substituted compound was reduced by warming an aqueous suspension thereof to 80° C. with one and one-half moles of sodium sulfide. When reduction was complete the reaction mixture was cooled to room temperature and filtered, and the residue was washed and dried. The product was purified by dissolving the product in a dilute non-oxidizing acid at 45° C., filtering, cooling the filtrate and neutralizing the acid with caustic soda.

The compound is represented by the formula

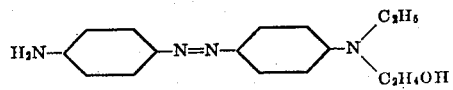

A cellulose acetate fabric was dyed with the compound in a bath heated to 160° F. The substantivity was good whereas 4'-amino-4-dimethyl amino-azo benzene has relatively poor substantivity for this material at this temperature. The dye was diazotized on the fiber and coupled with beta-hydroxy-naphthoic acid in slightly acid medium at 150° F. The developed dye was a bright black shade. The developed dye is represented by the formula

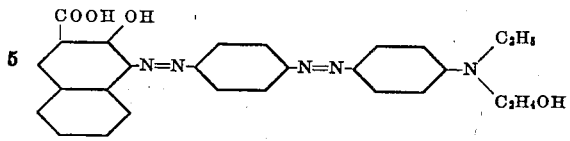

The dyed material was superior to the similarly developed dyes from 4'-amino-4-dimethyl amino-azo benzene or from 4'-amino benzene azo-4-amino naphthalene with respect to sublimation and staining.

*Example II*

The same base was prepared in the following manner: 180 parts of oxalyl para phenylene diamine are dissolved in 2500 parts of water and 110 parts of 28.5% ammonia solution. The solution was cooled to 0° C.–5° C. by the addition of ice and 69 parts of sodium nitrite were added. This solution was stirred into a mixture of 1000 parts of water and 360 parts of a 31.5% hydrochloric acid solution cooled with ice to 0° C.–5° C. When diazotization was complete a solution of 165 parts of ethyl, hydroxy ethyl aniline in 1000 parts of water and 100 parts of a 31.5% hydrochloric acid solution were added to the diazo. 340 parts of sodium acetate hydrate were added, followed by the slow addition of a dilute solution containing 100 parts of sodium hydroxide. Coupling was complete in about two hours and the temperature was 15° C. to 20° C. Enough sodium hydroxide was added to give a 5% solution and the temperature was raised to 90° C. and held there until hydrolysis was complete. This required three to four hours. The reaction mixture was filtered at 20° C. and the residue washed with sufficient cold water to free it from alkali. The weight of the dry product was 255, corresponding to a yield of 90%. This compound is the same as the intermediate produced in accordance with the process of Example I and gave the same dye when developed with beta-hydroxy-naphthoic acid.

*Example III*

An equivalent of 4-nitro-2-chlor-aniline instead of para nitro-aniline was used in accordance with the procedure of Example I and 4'-amino-2'-chloro-4(ethyl, hydroxy ethyl amino) azo benzene which is represented by the following formula was prepared

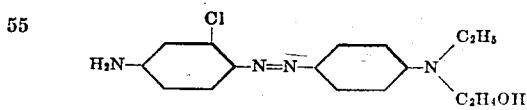

This compound was dyed on cellulose acetate and developed in the manner described in Example I. The substantivity, and lack of sublimation and staining compared favorably with the products of Example I. The developed dye is represented by the formula

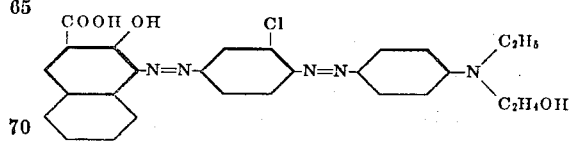

*Example IV*

In a similar manner 4'-amino-4-(ethyl, hydroxy ethyl) amino-2-methyl azo benzene was prepared by coupling diazotized para nitro aniline to (ethyl, hydroxy ethyl) meta toluidine. This compound having the desirable properties of the products of Example I is represented by the formula

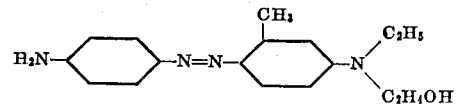

Dyed on cellulose acetate and similarly developed, the developed dye had the superior properties of the developed dye of Example I. The developed dye is represented by the formula

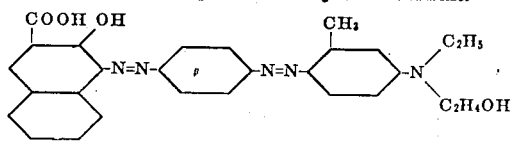

The intermediates which are used in accordance with this invention have good substantivity to cellulose esters and ethers and yield improved black shades upon diazotization and development on the fiber with the beta-hydroxy naphthoic acid. The amino bases are represented by the general formula

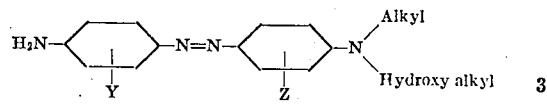

in which Y is hydrogen, alkyl, alkoxy or halogen and Z is hydrogen, alkyl, alkoxy or halogen. Y and Z may be alike or unlike groups. Either or both of the benzene nuclei may be unsubstituted or both may be substituted by one or more like or unlike groups of the kinds described. Sufficient modifications are ordinarily obtainable with no more than two such substituents in one or both benzene nuclei but more can be used. Alkyl groups having one or more carbon atoms, such as methyl, ethyl, propyl, butyl and the corresponding alkoxy groups can be used. The hydroxy alkyl groups may contain two or more carbons and the alkyl and hydroxy alkyl groups may have the same or a different number of carbons. Any of the halogens may be present.

The final insoluble products are represented in general by the formula

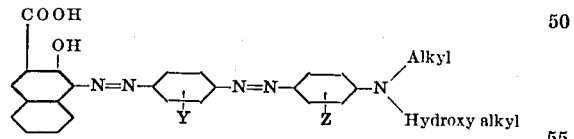

in which Y and Z represent the groups already described.

In general, the developed dyes of the invention have the improved non-staining characteristic when the dyed material is subjected to steam, heat alone or severe washing. The intermediate azo combinations have superior affinity for cellulose esters, such as cellulose acetate textiles and good dischargeability, even at temperatures as low as 160° F. Consequently, it is unnecessary to heat the dye baths containing the intermediates to such temperatures as 190° F. which are the temperatures commonly used for dyeing cellulose esters. Thus the present invention enables the dyer to employ dye baths which are below the temperatures that deleteriously affect fabrics and fibers composed of cellulose esters. An advantageous characteristic of the dyestuffs of the invention resides in the dyeing strength of the baths containing the intermediates when the baths are at relatively low temperatures in that there is only a slight difference in strength at 160° F. as compared to the strength at 190° F.

This application is a division of my copending application, Serial No. 153,518, filed July 14, 1937.

It is apparent that variations in the substituents and in the processes will produce corresponding variations in the products. As many such variations which will be suggested to those skilled in the art can be made without departing from the spirit and scope of the invention, it will be understood that the invention is not restricted to the illustrative embodiments which are specifically set forth.

I claim:

1. A compound represented by the formula

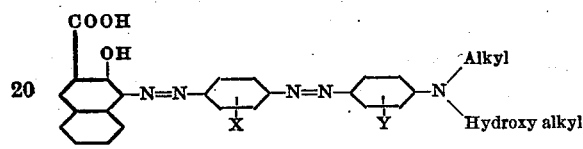

in which X and Y are each at least one of a group consisting of hydrogen, alkyl, alkoxy and halogen, and hydroxy alkyl contains at least two carbon atoms.

2. A compound represented by the formula

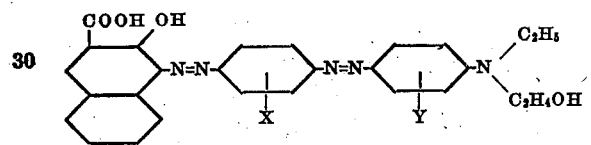

in which X and Y are at least one of a group consisting of hydrogen, alkyl, alkoxy and halogen.

3. The compound represented by the formula

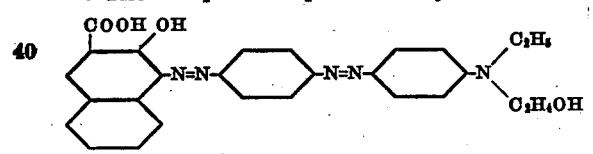

4. The compound represented by the formula

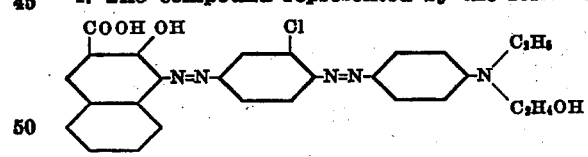

5. The compound represented by the formula

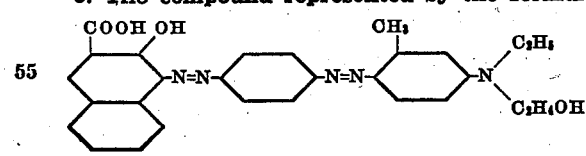

6. Cellulose ester dyed with a dye represented by the formula

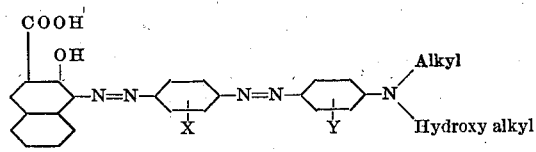

in which X and Y are each at least one of a group consisting of hydrogen, alkyl, alkoxy and halogen, and hydroxy alkyl contains at least two carbon atoms.

7. Cellulose ester dyed with a dye represented by the formula

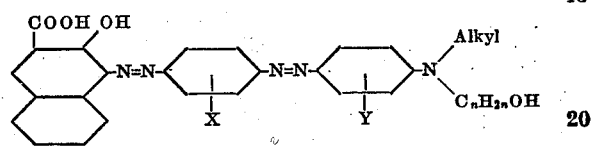

in which X and Y are each at least one of a group consisting of hydrogen, alkyl, alkoxy and halogen.

8. Cellulose ester dyed with a dye represented by the formula

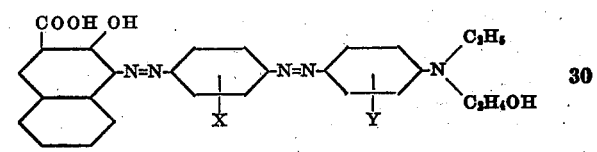

in which X and Y are at least one of a group consisting of hydrogen, alkyl, alkoxy and halogen.

9. Cellulose ester dyed with the dye represented by the formula

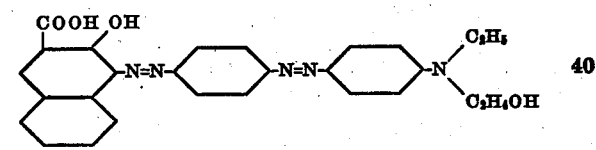

10. A process which comprises dyeing fibers of a cellulose ester with a compound represented by the formula

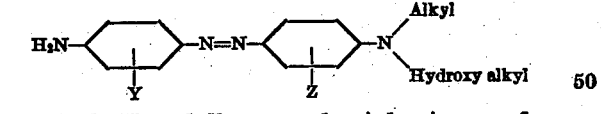

in which Y and Z are each at least one of a group consisting of hydrogen, alkyl, alkoxy and halogen and hydroxy alkyl contains at least two carbons; diazothizing said compound and coupling on said fibers with 2-hydroxy-naphthalene-3-carboxylic acid.

DONOVAN E. KVALNES.